Oct. 7, 1969     M. SOLINS     3,471,158
COMPOSITE MOISTURE PROOFING DEVICE
Filed Oct. 14, 1968
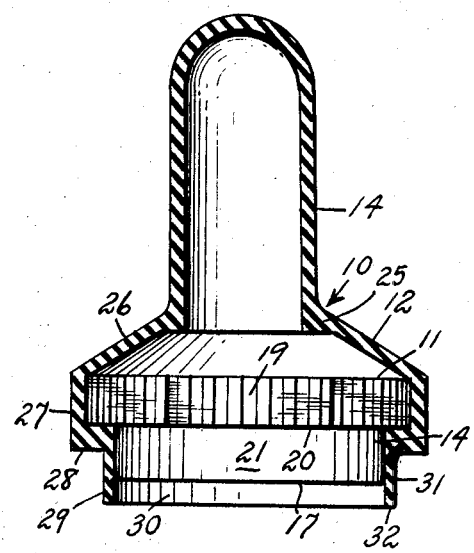
*Fig. 1*
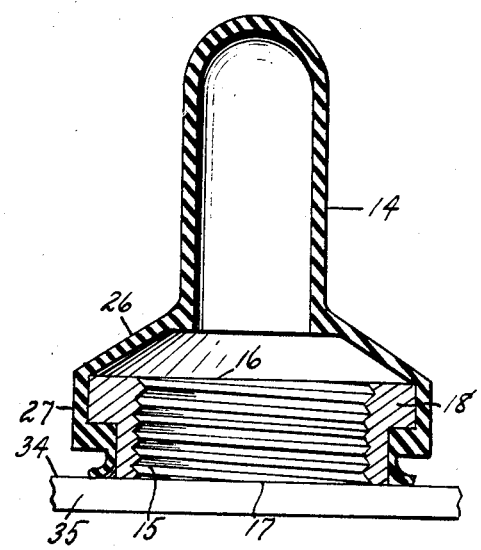
*Fig. 3*
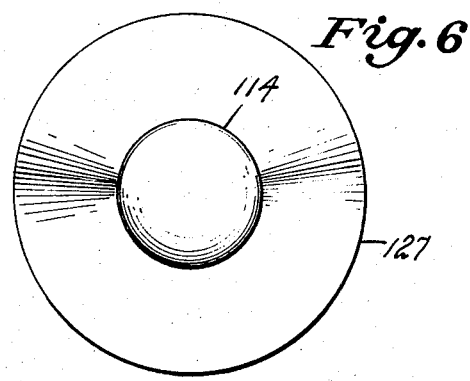
*Fig. 6*
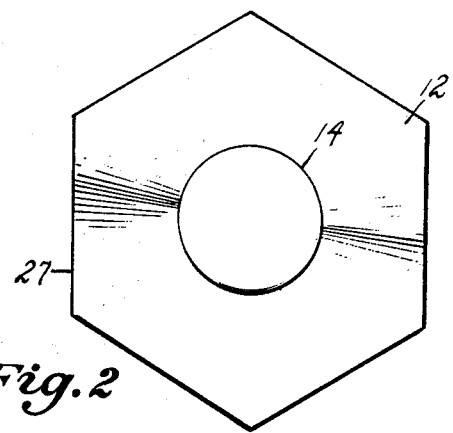
*Fig. 2*
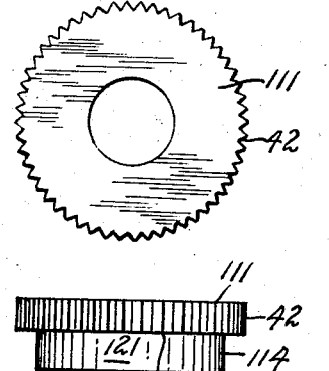
*Fig. 5*
*Fig. 4*
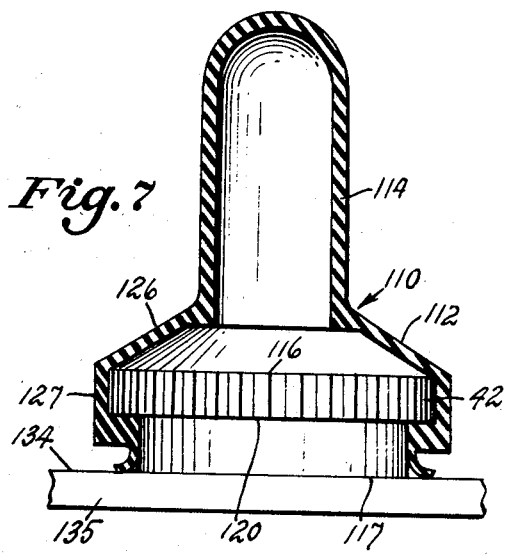
*Fig. 7*

United States Patent Office 3,471,158
Patented Oct. 7, 1969

3,471,158
COMPOSITE MOISTURE PROOFING DEVICE
Milton Solins, Tenafly, N.J., assignor to A.P.M.
Corporation, Englewood, N.J.
Continuation-in-part of application Ser. No. 636,560,
Mar. 2, 1967. This application Oct. 14, 1968, Ser.
No. 767,289
Int. Cl. F16j 15/50, 15/00
U.S. Cl. 277—32
2 Claims

ABSTRACT OF THE DISCLOSURE

A composite moisture-proofing device including a metallic nut element and a resilient boot element retained upon said nut element solely as a result of resilient contraction, said nut element including a rabbet forming portion adjacent one end thereof, said boot element including corresponding portions engaging said rabbet to prevent accidental disengagement of the boot element from the nut element. A generally cylindrically-shaped part of the rabbet engaging portion extends outwardly of the end of the nut element to form resiliently deformable sealing means against a planar surface contacting the end of the nut element.

---

This invention is a continuation in part of my co-pending application Ser. No. 636,560, filed Mar. 2, 1967, and now abandoned entitled "Radially Expandable Sealing Device."

This invention relates generally to the field of sealing devices of a type including a nut engageable with various types of control devices, such as toggle switches, push buttons, rotary shafts and the like, to thereby maintain the same within an opening in a panel, and simultaneously effect a moisture-proofing seal about the panel.

Devices of this general type are well known in the art, and the invention lies in specific constructional improvements.

In the manufacture of devices of this type, it is customary to provide a nut element which is threadedly engaged within a mold, and the resilient part (usually silicone rubber) is thereafter molded around the nut. After curing, the completed device may be unscrewed from the mold. While this method of manufacture results in an acceptable device, the cost of manufacture is quite costly. Often various chemical products or primers must be applied to the surface of the nut to insure proper bonding between the metallic surface of the nut and the rubber.

It is therefore among the principal objects of the present invention to provide in a device of the class described a separate boot element and nut element which are held together solely as a result of the resilient contraction of an independently molded boot element upon the nut element.

Another object of the invention lies in the provision of a separate radially expandable boot element cooperating with a nut element which will allow for adequate commercial tolerance in the sizing of the nut elements.

Another object of the invention lies in the provision of a composite sealing device, in which the boot element may be separately replaced, if necessary, without loss of the nut element.

Still a further object of the present invention lies in the provision of an improved device of the character described in which the cost of fabrication may be of a considerably reduced order, as contrasted with existing prior art devices, thereby permitting consequent wide sale, distribution and use.

A feature of the disclosed embodiments lies in the ease with which the device may be manually assembled, without the use of any tools by those having only ordinary skill.

Another feature of the invention lies in the provision in an improved devices of the class described of resiliently expandable sealing means which, upon expansion, tend to hold the boot element in position upon the nut element.

Yet another feature of the disclosed embodiment lies in the provision of a boot element which not only grips the nut upon engagement therewith, but folds inwardly beneath the shoulder of a rabbet formed in the nut element, so as to engage the surface of a panel by an inwardly protruding resilient skirt, the expansion of which places additional resilient tension upon the boot, tending to retain the boot in place upon the nut element while simultaneously effecting a seal against the panel.

These objects and features, as well as other incidental ends and advantages will more fully appear in the progress of the following disclosure, and be pointed out in the appended claims.

In the drawing, to which reference will be made in the specification, similar reference characters have been employed to designate corresponding parts throughout the several views.

FIG. 1 is a longitudinal central sectional view of a first embodiment of the invention, prior to installation in sealing position.

FIG. 2 is a plan view of the first embodiment.

FIG. 3 is a sectional view, similar to that seen in FIG. 1, and showing the device in installed condition against a panel.

FIG. 4 is a side elevational view of a nut element forming part of a second embodiment of the invention.

FIG. 5 is a plan view of the nut element seen in FIG. 4.

FIG. 6 is a plan view of a fully assembled second embodiment.

FIG. 7 is a longitudinal sectional view corresponding to that shown in FIG. 3 of the second embodiment.

In accordance with the first embodiment of the invention, the device, generally indicated by reference character 10, comprises broadly: a nut element 11 and a boot element 12.

The nut element 11 may be manufactured as a screw machine part, or die cast. It includes a cylindrical portion 14 having a continuous threaded bore 15 extending between a first or upper planar surface 16 and a second or lower planar surface 17. A radially extending flange 18 is positioned adjacent the upper surface 16, and is bounded by a peripherally disposed polygonal surface 19 and a radially extending surface 20. The surface 20 and a cylindrical surface 21 surrounding the lower portion of the nut element cooperate to form a rabbet of circular configuration.

The boot element 12, as has been mentioned, is preferably formed from silicone rubber or similar materials which are relatively impervious to the deleterious effects of oils, greases and other ambient substances. It includes an outer member 14, adapted to engage a portion of the control (not shown) which it surrounds, including a radially extending conically-shaped portion 25. The portion 25 interconnects with a first peripheral member 26 adapted to overlie the surface 19, a second peripheral member 27 adapted to overlie the surface 20, and a third peripheral member 28 overlying the surface 21. The member 28 includes a tubular sealing portion 29 bounded by an inner surface 30, an outer surface 31 and an end edge 32. As best seen in FIG. 1, when in this engaged position with respect to a panel, the sealing portion 29 extends past the lower planar surface 17 of the nut element 11, so as to be resiliently radially distorted upon such engagement.

During the manufacture of the first embodiment, the boot element 12 is separately molded, using techniques well known in the art, and subsequentally manually assembled by inserting the nut element 11 into the opening formed by the sealing portion 29, the boot element resiliently expanding during this operation to subsequently contract upon the nut element and hold itself in position.

Upon the engagement of the device 10 with the outer surface 34 of a panel 35, the threaded bore 15 engages the threaded member of a control member (not shown) to maintain the latter in position within an opening in the panel. During this engagement, which may be accomplished manually, or with the assistance of a wrench, the sealing portion 29 will be radially spread to skirt-like configuration, as best seen in FIG. 3, resulting in an increase in tension, the reactive force of which tends to maintain the third peripheral member 29 further in position within the rabbet 22.

Turning now to the second embodiment of the invention, illustrated in FIGS. 4 through 7, inclusive, parts corresponding to those of the principal embodiment have been designated by similar reference characters with the additional prefix 1.

The second embodiment differs from the first embodiment in the provision of a nut element 111 having an arcuate serrated edge 42 which replaces the polygon-shaped peripheral surface 19 of the first embodiment. The serrated edge 42, upon the assembly of the device, tends to dig into the inner surface of the first peripheral member 127 upon the contraction of the boot element 112 upon the nut element, thus making it possible to conveniently manually engage the device without the use of tools.

I wish it to be understood that I do not consider the invention limited to the precise details of structure shown and set forth in this specification, for obvious modifications will occur to those skilled in the art to which the invention pertains.

I claim:

1. A composite moisture-proofing sealing device including a threaded nut element and a resilient boot element surrounding said nut element, to be resiliently maintained thereon; said nut element having a principal axis, and a threaded through bore extending coaxially therethrough between first and second planar surfaces perpendicular to said axis, said nut element having a first peripheral surface of generally arcuate configuration, a second peripheral surface radially disposed, communicating with said first peripheral surface, and a third peripheral surface of substantially arcuate configuration communicating with said second peripheral surface to form a rabbet therewith; said boot element including an outer member overlying said first planar surface of said nut element to effect a seal with respect to said bore at one end thereof, a first peripheral member overlying and resiliently gripping said first peripheral surface for the transmission of manually imparted torque thereto, a second peripheral member of relatively thicker cross-section as compared to said first and second peripheral member of said boot element, and lying in a portion of said rabbet adjacent said second peripheral surface of said nut element, and a third peripheral member of tubular configuration when in relatively unstressed condition, said third peripheral member being of a length as measured parallel to said principal axis substantially greater than that of the portion of said rabbet unoccupied by said second peripheral member, to extend beyond said second planar surface of said nut element; whereby upon the engagement of said second planar surface of said nut element with the planar surface surrounding an opening in a panel to be sealed, said fourth member is resiliently distorted to a flared condition.

2. Structure in accordance with claim 1, further characterized in that said first peripheral surface of said nut element is of arcuate serrated configuration to effect a superior engagement between said nut and boot elements.

References Cited

UNITED STATES PATENTS

| | | | |
|---|---|---|---|
| 2,462,023 | 2/1949 | Johanson et al. | 74—18.1 |
| 2,715,654 | 8/1955 | Lucas | 174—77 |
| 2,795,144 | 6/1957 | Morse | 74—17.8 |

SAMUEL ROTHBERG, Primary Examiner

U.S. Cl. X.R.

174—77; 200—168; 277—17.8, 166, 178